(12) United States Patent
Mattisson

(10) Patent No.: US 6,345,176 B1
(45) Date of Patent: Feb. 5, 2002

(54) RADIO FRONT-END CIRCUIT

(75) Inventor: Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/004,766

(22) Filed: Jan. 9, 1998

(30) Foreign Application Priority Data

Jan. 9, 1997 (SE) ................................................ 9700043

(51) Int. Cl.$^7$ ................................................ H04B 1/26
(52) U.S. Cl. ...................... 455/296; 455/318; 455/251.1
(58) Field of Search .............................. 455/84, 85, 86, 455/132, 133, 135, 188.1, 188.2, 189.1, 190.1, 296, 318, 232.1, 251.1

(56) References Cited

U.S. PATENT DOCUMENTS

| 4,225,823 | A | | 9/1980 | Ogita | |
|---|---|---|---|---|---|
| 5,437,051 | A | * | 7/1995 | Oto | 455/189.1 |
| 5,687,197 | A | * | 11/1997 | Powell, II et al. | 455/135 |
| 5,742,896 | A | * | 4/1998 | Bose et al. | 455/133 |
| 5,802,477 | A | * | 9/1998 | Miyazaki | 455/86 |

FOREIGN PATENT DOCUMENTS

| DE | 242 919 | 2/1987 |
|---|---|---|
| EP | 742 640 | 11/1996 |

* cited by examiner

Primary Examiner—Lester G. Kincaid
(74) Attorney, Agent, or Firm—Burns, Doane, Swecker & Mathis, L.L.P.

(57) ABSTRACT

In a radio front-end circuit having at least two amplifier-mixer cascades, the amplifiers are switched on or off via the mixers. By switching between the amplifier-mixer cascades, the power consumption is lowered.

1 Claim, 1 Drawing Sheet

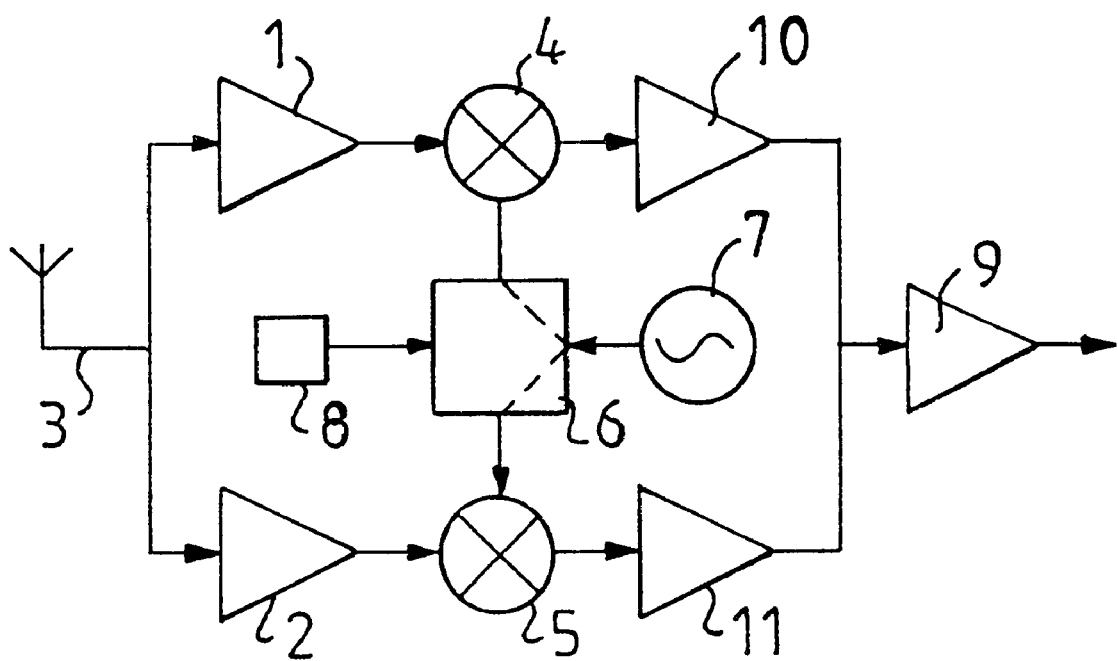

RADIO FRONT-END CIRCUIT

TECHNICAL FIELD

The invention relates to a radio front-end circuit and more specifically to a reconfigurable radio front-end circuit.

BACKGROUND OF THE INVENTION

Radio front-end circuits are typically designed for low-noise operation. Such operation requires the transconductance-source-resistance product, $g_m \cdot R_S$, of the input device, e.g. a bipolar or MOS transistor, of a front-end circuit to be much larger than 1. In its turn, this leads to a high current consumption as the quiescent current determines the transconductance of the input device.

Frequently, the signal strength is much higher than the sensitivity level of the front-end circuit. In such cases, the bias of the front-end circuit could be reduced in order to lower the supply current. The noise level would increase, but the signal-to-noise ratio could nevertheless be kept high enough not to degrade the received signal.

However, changing the front-end circuit bias degrades input matching and reduces linearity and band width to such an extent that it is hardly ever used. Lowering the quiescent current of the input device will lower the transit frequency of the device. For high-frequency applications, such as cellular telephony, this is no option because the transit frequency margin is too low. The current density of the input device has to be maintained which implies that it will be necessary to switch between two different front-end circuit structures. The switch necessary for altering the front-end circuit structure will contribute to the noise level and will typically degrade the low-noise performance. Furthermore, linearity is often also an issue.

SUMMARY

The object of the invention is to bring about a reconfigurable radio front-end circuit in which the power consumption is reduced when the signal strength is high.

This is attained by means of the front-end circuit according to the invention in that the amplifiers of the front-end circuit are switched on or off via the mixers instead of being switched on or off by switching the bias current or bias voltage of the amplifiers or by introducing separate switches or multipliers in the signal path.

The advantage of this is that the input impedance of the amplifier changes less than if its supply current is switched. Moreover, no new circuit elements are introduced in the signal path, which would otherwise destroy the noise performance.

BRIEF DESCRIPTION OF THE DRAWING

The invention will be described more in detail below with reference to the appended drawing, on which the single FIGURE illustrates one embodiment of a reconfigurable radio front-end circuit in accordance with the invention.

DETAILED DESCRIPTION

The embodiment of a reconfigurable radio front-end circuit in accordance with the invention illustrated on the drawing comprises a low noise amplifier 1 and a low current linear amplifier 2. It is to be understood that other types of amplifiers may be used and also that more than two amplifiers may be used.

The input terminal of the low noise amplifier 1 and the input terminal of the low current linear amplifier 2 are both connected to an antenna terminal 3 of the radio which is not shown in any further detail.

The output terminal of the low noise amplifier 1 is connected to a first input terminal of a low noise mixer 4. A second input terminal of the low noise mixer 4 is connected to a first output terminal of a local oscillator drive switch 6. The switch 6 has a local oscillator input terminal connected to a local oscillator 7, and a control input terminal connected to a control circuit 8.

The output terminal of the low current linear amplifier 2 is connected to a first input of a linear mixer 5. A second input terminal of the linear mixer 5 is connected to a second output terminal of the local oscillator drive switch 6.

It should be pointed out that if more than two amplifiers are used as indicated above, each amplifier is associated with its own mixer. Moreover, each mixer would be connected to its own output terminal of the switch 6.

The control circuit 8 is adapted to control the local oscillator drive switch 6 to connect/disconnect the mixers 4 and 5 to/from the local oscillator 7 in response to the strength of signals received by the antenna 3 and/or in response to any other parameter, e.g. interference strength.

In the embodiment shown, the output terminal of the low noise mixer 4 and the output terminal of the linear mixer 5 are connected to the input terminal of a common intermediate frequency amplifier 9 via a low noise intermediate frequency amplifier 10 and a low current intermediate frequency amplifier 11, respectively.

The control circuit 8 in the embodiment shown is adapted to control the local oscillator drive switch 6 in such a manner that the low noise mixer 4 is disconnected from the local oscillator 7 in response to high signal strength and/or high interference strength, and connected to the local oscillator 7 in response to low signal strength and/or low interference strength.

Also, in the embodiment shown, the mixer 4, when disconnected from the local oscillator 7 by means of the switch 6, is adapted to cause low noise amplifier 1 not to consume any power. Alternatively, the control circuit 8 in the embodiment shown can be adapted to switch off the quiescent current of the low noise amplifier 1 at the same time as the low noise mixer 4 is disconnected from the local oscillator 7.

As indicated above, more than two different amplifiers and associated mixers may be used. In accordance with the invention, it will, thus, be possible to switch e.g. between two or more low noise amplifier-mixer cascades depending on signal strength or another parameter such as interference strength an mentioned above. As described above, one amplifier-mixer cascade could be optimized for low noise, resulting in high power consumption, while the other could be optimized for low current and possibly high linearity. It would then be possible to lower the average power consumption by switching between these two cascades.

As indicated above, the advantage of this is that the input impedance of the amplifier changes less than if its supply current is changed, and that no new circuit elements are introduced in the signal path which would otherwise destroy the noise performance.

What is claimed is:

1. A radio front-end circuit comprising at least two amplifiers, wherein at least one of the amplifiers is a low noise amplifier and at least one other amplifier is a low current linear amplifier, an input terminal of each amplifier to be connected to an antenna terminal of the radio, an output terminal of each amplifier being connected to a first input terminal of an associated mixer, a second input terminal of each mixer being connected to a local oscillator, and an output terminal of each mixer to be connected to an input terminal of an intermediate frequency amplifier, and a switch interconnected between the local oscillator and the respective second input terminal of each mixer to connect and disconnect, respectively, the local oscillator to and from, respectively, the respective mixer, wherein the output terminal of each mixer is connected to the input terminal of the common intermediate frequency amplifier via a low noise intermediate frequency amplifier and a low current intermediate frequency amplifier, respectively.

* * * * *